No. 866,985.
PATENTED SEPT. 24, 1907.
C. E. TREWHELLA.
PERCOLATOR.
APPLICATION FILED NOV. 7, 1906.
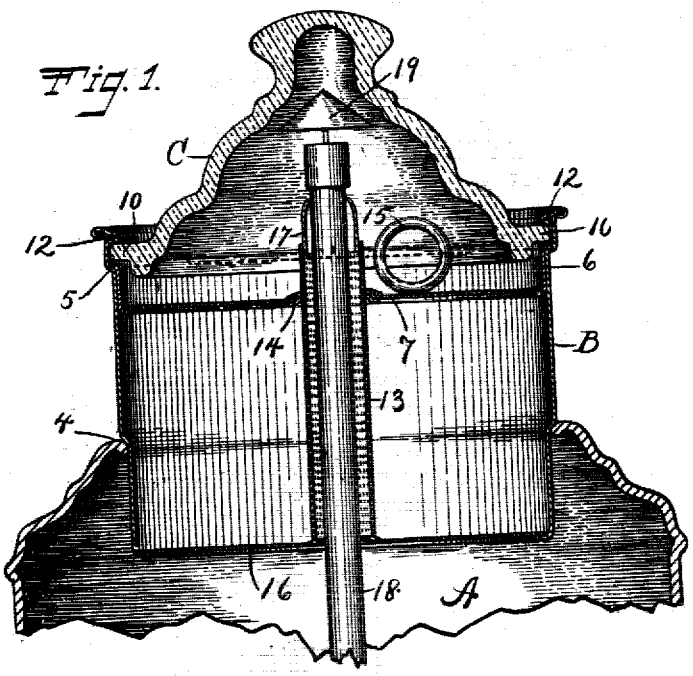
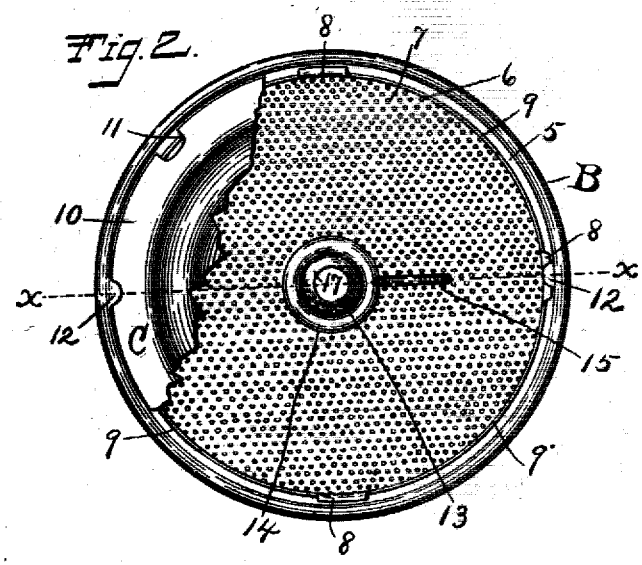
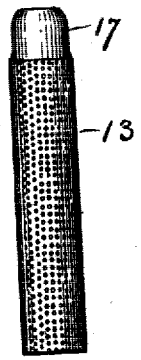
Witnesses.
Inventor.
Charles E. Trewhella
By James Shepard
Atty.

UNITED STATES PATENT OFFICE.

CHARLES E. TREWHELLA, OF FORESTVILLE, CONNECTICUT, ASSIGNOR TO AMERICAN SILVER COMPANY, OF BRISTOL, CONNECTICUT, A CORPORATION.

PERCOLATOR.

No. 866,985.　　　Specification of Letters Patent.　　　Patented Sept. 24, 1907.

Application filed November 7, 1906. Serial No. 342,380.

*To all whom it may concern:*

Be it known that I, CHARLES E. TREWHELLA, a citizen of the United States, residing at Forestville, in the county of Hartford and State of Connecticut, have invented certain new and useful Improvements in Percolators, of which the following is a specification.

My invention relates to improvements in percolators, and the main object of my improvement is to furnish simple and efficient means to provide for an excess of liquid in the percolator cup.

In the accompanying drawings:—Figure 1 is a central vertical section on the line x x of Fig. 2, of the percolator cup and so much of a percolator as is necessary to show its connection therewith, the fountain tube, the spreader and the handle of the retaining plate, being shown in side elevation. Fig. 2 is a broken plan view of the cup and parts especially belonging thereto, the fountain tube, spreader and body of the percolator vessel shown in Fig. 1, being omitted from the said Fig. 2. Fig. 3 is a detached side elevation of the overflow tube of the cup.

A designates a portion of the body of a percolator vessel, into the top of which my cup B is fitted in any proper manner, but preferably by entering the mouth of the said vessel and resting by an external shoulder 4 on the rim of the said mouth as shown. The cup B may be of any desired depth, and is provided with a mouth having an internal shoulder 5 upon which to seat the rim 6 of the retainer which carries the perforated plate 7, the said rim having out turned lugs or flanges 8, that are seated on the said internal shoulder 5 with the retainer plate 7 in a plane below the said shoulder. The rim 6 has formed on it, seats 9, upon which to rest the under side of the rim 10 of the cover C. The rim of this cover is provided with two or more notches 11, and the interior of the cup at its mouth, is provided with a corresponding number of lugs 12, correspondingly located, so that the cover when held in a position to have the said notches register with the said lugs, may enter the mouth of the cup sufficiently to seat the rim 10 on the seats 9 of the retainer, and then by rotating the cover to carry the unnotched portion of the rim under the lugs 12, as shown at the left hand side of Fig. 2, the cover is held down on the retainer to hold the retainer in place. It is not new with me to hold the cover in place by means of a notched cover rim and lugs within the receptacle to which the cover is fitted, but I employ this old construction of cover and receptacle to hold the retainer of the cup down on its seats. The retainer plate is finely perforated to let liquid pass through it freely while at the same time it will hold down the coffee or other material in the cup and prevent it from rising upwardly when there is an excess of fluid in the cup. The retainer is centrally perforated to receive the overflow tube 13, and I prefer to bind the said perforation with a metal reinforce 14. For convenience of lifting the retainer out of the cup it may be provided with any suitable handle 15. The bottom of the cup is provided with the usual strainer 16. In the center of this strainer is the finely perforated over flow tube 13, provided with a contracted tip 17 at its upper end, the said tube extending upwardly far enough to bring the upper portion of its perforations above the retainer plate 7, when the parts are in the position shown in Fig. 1. The percolator is provided with the ordinary fountain tube 18, the overflow tube 13 being of a larger diameter than the said fountain tube so as to leave ample space between them for the downward passage of liquid, while the smallest diameter of the tip of the said overflow tube is approximately that of the said fountain tube, as shown in Fig. 1. The usual spreader 19, may be placed on the tip 17 of the over flow tube 13, or on the upper end of the fountain tube 18.

The cup is charged in the usual manner. As liquid is forced up through the fountain tube it falls upon the retainer plate 7 and passes down into and through the cup as usual. That portion of the overflow tube which lies below the retainer plate 7, serves as an additional strainer to drain the surrounding material, so that the cup will take care of more liquid without setting back above the retainer, than it would do were it not for the said tube. Whenever the liquid sets back above the retainer plate it flows through the perforated portion of the tube 13 that lies above the retainer plate, and then down through the annular space between the outside of the fountain tube and inner side of the overflow tube into the receptacle or vessel A. As none of the coffee grounds can rise above the retainer plate 7, the perforations in the tube 13 above the said plate do not become clogged and the percolator will always take care of as much liquid as can ever be forced up through the fountain tube.

I am aware that it is old to make provision for an overflow of a percolator cup, but so far as I know such provision has always been made by means of passages leading downwardly on the exterior of the cup.

By my improvement an ample overflow is provided for in a simple and inexpensive manner. It can be used with an elevated cup that extends upwardly to a considerable height above the top of the main receptacle, which elevated cup could not be used with an external overflow. My overflow can be applied to various percolator cups without any change in the general construction or dimensions of the cup. I also hold the retainer in place at the top of the cup by means of the cover.

I claim as my invention:

1. In a percolator, the combination of a cup having a perforated central overflow tube extending upwardly from its bottom and provided with a contracted tip at its upper end, with a fountain tube of a smaller diameter than said overflow tube and extending upwardly through the said overflow tube and its contracted tip, the smallest diameter of which is approximately the same as that of the said fountain tube, and a finely perforated retainer fitted to the upper part of the said cup and overflow tube, the perforations in which tube permit an excess of liquid to flow from the retainer into and down through the said overflow tube.

2. In a percolator, the combination of a cup having an internal shoulder within its mouth with a retainer within the said cup and seated on the said shoulder, a cover, the rim of which is seated on the said retainer, and locking recesses and lugs on the said cover and cup to hold the cover down on the retainer.

CHARLES E. TREWHELLA.

Witnesses:
E. S. LASKER.
A. D. WILSON.